(12) United States Patent
Ritzberger et al.

(10) Patent No.: US 12,516,884 B2
(45) Date of Patent: Jan. 6, 2026

(54) OVEN FOR HEATING A DENTAL OBJECT

(71) Applicant: Ivoclar Vivadent AG, Schaan (LI)

(72) Inventors: Christian Ritzberger, Grabs (CH);
Markus Rampf, Seewis Dorf (CH);
Marc Dittmer, Feldkirch (AT);
Christian Niedrig, Rüthi (CH)

(73) Assignee: Ivoclar Vivadent AG, Schaan (LI)

( * ) Notice: Subject to any disclaimer, the term of this patent is extended or adjusted under 35 U.S.C. 154(b) by 363 days.

(21) Appl. No.: 18/046,429

(22) Filed: Oct. 13, 2022

(65) Prior Publication Data
US 2023/0125010 A1 Apr. 20, 2023

(30) Foreign Application Priority Data

Oct. 14, 2021 (EP) .................................. 21202639

(51) Int. Cl.
F27B 17/00 (2006.01)
A61C 13/08 (2006.01)
A61C 13/15 (2006.01)
A61C 13/20 (2006.01)
F27B 17/02 (2006.01)
F27D 21/00 (2006.01)

(52) U.S. Cl.
CPC .......... *F27B 17/025* (2013.01); *A61C 13/082* (2013.01); *A61C 13/20* (2013.01); *A61C 19/003* (2013.01); *F27D 21/00* (2013.01); *A61C 2201/002* (2013.01)

(58) Field of Classification Search
CPC ..... A61C 13/082; A61C 13/20; A61C 19/003; A61C 2201/002; F27B 17/025; F27D 21/00
See application file for complete search history.

(56) References Cited

U.S. PATENT DOCUMENTS

| | | | |
|---|---|---|---|
| 2,628,160 A | 2/1953 | Stookey | |
| 2,971,853 A | 2/1961 | Stookey | |
| 4,208,573 A | 6/1980 | Risse | |
| 4,480,044 A | 10/1984 | McAlinn | |
| 4,645,649 A | 2/1987 | Nagao | |
| 5,062,877 A | 11/1991 | Borrelli et al. | |
| 5,094,619 A | 3/1992 | McLaughlin | |
| 5,135,686 A | 8/1992 | Masuhara et al. | |
| 5,162,130 A | 11/1992 | McLaughlin | |
| 5,547,635 A * | 8/1996 | Duthie, Jr. ................ | A61L 2/10 422/186.05 |
| 5,698,020 A | 12/1997 | Salz et al. | |
| 7,262,144 B2 | 8/2007 | Schreder et al. | |
| 7,829,489 B2 | 11/2010 | Borrelli et al. | |
| 8,047,021 B2 | 11/2011 | Schweiger et al. | |

(Continued)

FOREIGN PATENT DOCUMENTS

CN 109896729 A1 6/2019
DE 102005003595 A1 7/2006
(Continued)

*Primary Examiner* — Nicholas D Lucchesi
(74) *Attorney, Agent, or Firm* — Ann M. Knab; Thad McMurray

(57) ABSTRACT

An oven (100) for heating a dental object (101), having a chamber (103) for receiving the dental object (101); a radiation source (105) for emitting radiation having a wavelength smaller than 350 nm into the chamber (103); and heating means (113) for heating the dental object (101) in the chamber (103).

11 Claims, 2 Drawing Sheets

(56) References Cited

U.S. PATENT DOCUMENTS

| | | |
|---|---|---|
| 8,721,336 B2 | 5/2014 | Rheinberger et al. |
| 9,949,809 B2 | 4/2018 | Lewis et al. |
| 10,617,495 B2 | 4/2020 | Korten et al. |
| 11,408,629 B2 | 8/2022 | Lee |
| 2005/0263719 A1 | 12/2005 | Ohdaira |
| 2006/0147339 A1* | 7/2006 | Hunter ............... A61L 2/10 250/455.11 |
| 2006/0261503 A1* | 11/2006 | Sago ............... A61C 13/081 264/16 |
| 2009/0246739 A1* | 10/2009 | Jussel ............... H05B 6/806 219/412 |
| 2012/0012577 A1 | 1/2012 | Jussel et al. |
| 2012/0309607 A1 | 12/2012 | Durschang |
| 2013/0270445 A1* | 10/2013 | Gaska ............... A61N 5/0624 250/431 |
| 2013/0295523 A1 | 11/2013 | Durschang |
| 2014/0113237 A1* | 4/2014 | Rohner ............... F27B 5/14 219/390 |
| 2014/0141960 A1 | 5/2014 | Borczuch-Laczka et al. |
| 2014/0200129 A1 | 7/2014 | Durschang |
| 2014/0231408 A1* | 8/2014 | Jussel ............... F27B 17/025 219/425 |
| 2014/0252272 A1 | 9/2014 | Durschang |
| 2014/0339216 A1* | 11/2014 | Jussel ............... F27B 5/18 219/390 |
| 2014/0370464 A1 | 12/2014 | Kounga |
| 2015/0140274 A1 | 5/2015 | Burke |
| 2015/0374589 A1 | 12/2015 | Rampf |
| 2016/0057816 A1* | 2/2016 | Alias ............... H05B 6/6438 219/679 |
| 2016/0257607 A1 | 9/2016 | Ritzberger |
| 2016/0340228 A1 | 11/2016 | Schreder et al. |
| 2017/0088456 A1 | 3/2017 | Rampf |
| 2017/0144919 A1 | 5/2017 | Krolikowski et al. |
| 2017/0156828 A1* | 6/2017 | Leeson ............... B23Q 3/061 |
| 2017/0355636 A1 | 12/2017 | Borrelli |
| 2018/0009701 A1 | 1/2018 | Rampf |
| 2018/0244563 A1 | 8/2018 | Dittmer |
| 2018/0256297 A1 | 9/2018 | Vollmann |
| 2018/0290913 A1 | 10/2018 | Gödiker |
| 2019/0167395 A1 | 6/2019 | Baholzer |
| 2019/0217534 A1 | 7/2019 | Verboomen |
| 2020/0000563 A1 | 1/2020 | Specht |
| 2022/0318520 A1 | 10/2022 | Pouran Ben Veyseh et al. |
| 2022/0318683 A1 | 10/2022 | Sawaf et al. |
| 2023/0012752 A1 | 1/2023 | Ritzberger |
| 2023/0119981 A1 | 4/2023 | Niedrig |
| 2023/0121316 A1 | 4/2023 | Rampf |

FOREIGN PATENT DOCUMENTS

| | | |
|---|---|---|
| FR | 2507296 A1 | 12/1982 |
| JP | 3203603 U | 4/2016 |
| WO | 2004051716 A1 | 6/2004 |
| WO | 2011113568 A1 | 9/2011 |
| WO | 2012057252 A1 | 5/2012 |
| WO | 2018162055 A1 | 9/2018 |
| WO | 2021048733 A1 | 3/2021 |

\* cited by examiner

OVEN FOR HEATING A DENTAL OBJECT

CROSS-REFERENCE TO RELATED APPLICATIONS

This application claims priority to European patent application No. 21202639.7 filed on Oct. 14, 2021, which disclosure is incorporated herein by reference in its entirety.

TECHNICAL FIELD

The present invention relates to an oven for heating a dental object and a method for heating the dental object.

BACKGROUND

Polychromic glasses and glass-ceramics can be colored by a light exposure in combination with a thermal treatment, such as a quartz glass, a quartz glass-ceramic, a lithium aluminosilicate glass, a lithium aluminosilicate glass-ceramic, a lithium silicate glass or a lithium silicate glass-ceramic. In this case, light exposure is usually by means of UV radiation. The distinct color effect is produced after light exposure mainly by an additional temperature treatment.

For this purpose, the polychromic glasses and glass-ceramics comprise, for example, an oxidizable component and a reducible coloring component. The oxidizable component is a component that can be oxidized or excited to emit electrons by irradiation. Oxidizable components include, for example, cerium ions, europium ions, copper ions, and mixtures thereof. The reducible dye component is, for example, a component that can be reduced to form a color change. Preferred reducible dye components are cations of metals, such as silver, gold, copper, or combinations thereof.

SUMMARY

It is the technical aim of the present invention to provide an application-safe and simple coloring of a dental object.

This technical aim is achieved by subject-matter according to the independent claims. Technically advantageous embodiments are the subject of the dependent claims, the description and the drawings.

According to a first aspect, the technical problem is solved by an oven for heating a dental object, comprising a chamber for receiving the dental object; a radiation source for emitting radiation having a wavelength smaller than 350 nm into the chamber; and a heating means for heating the dental object in the chamber. Thus, the technical advantage is achieved such that exposure and thermal treatment for coloring the dental object can be performed in one apparatus.

In a technically advantageous embodiment of the oven, the heating means is configured to heat the dental object to a temperature of up to 1200° C. The heating means may be configured to heat the dental object in a temperature range between 25° C. and 1200° C., between 25° C. and 1100° C. or between 25° C. and 1000° C. This provides, for example, the technical advantage that the dental object can be heated to suitable temperatures for coloring.

In a further technically advantageous embodiment of the oven, the oven comprises a control device for controlling the radiation source and/or the heating means. This provides, for example, the technical advantage that the radiation source and the heating means can be activated automatically without direct intervention by a user.

In a further technically advantageous embodiment of the oven, the control device comprises a learned algorithm for controlling the radiation source and/or the heating means. The algorithm may be a machine learning algorithm. This provides, for example, the technical advantage that the coloring of the dental object can be automated using training data.

In a further technically advantageous embodiment of the oven, the control device is configured to temporally control an intensity of the radiation source and/or a temperature of the heating means. For example, the control device may execute predetermined intensity and temperature sequences. This provides, for example, the technical advantage that a fine-tuned exposure and thermal treatment can be carried out to obtain a desired coloring of the dental object.

In a further technically advantageous embodiment of the oven, the control device is configured to activate the radiation source and heating means simultaneously or with a time delay. This achieves, for example, the technical advantage that the exposure can be carried out before or during the thermal treatment.

In a further technically advantageous embodiment of the oven, the oven comprises an electronic camera for detecting a color value of the dental object. This provides, for example, the technical advantage that the color value of the dental object can be monitored during heating.

In a further technically advantageous embodiment of the oven, the oven is configured to terminate a heating of the dental object when the dental object has reached a predetermined color value.

This provides, for example, the technical advantage that the predetermined color value can be precisely achieved.

In a further technically advantageous embodiment of the oven, the oven comprises a cooling means for cooling the heated dental object. This has the technical advantage, for example, that an achieved shade value can be stabilized and recoloring of the dental object is prevented.

In a further technically advantageous embodiment of the oven, the heating means is formed by an infrared radiation source, a laser radiation source, a microwave radiation source or an induction radiation source. This provides, for example, the technical advantage that particularly suitable heating means are used for heating the dental object.

In a further technically advantageous embodiment of the oven, the oven comprises a moving means for moving the dental object in front of the heating means and/or the radiation source. This provides, for example, the technical advantage that the thermal treatment and the radiation can be directed to different areas of the dental object.

According to a second aspect, the technical problem is solved by a method for heating a dental object, comprising the steps of receiving the dental object in a chamber; emitting radiation with a wavelength smaller than 350 nm into the chamber by a radiation source; and heating the dental object in the chamber by a heating means. The method achieves the same technical advantages as the oven according to the first aspect.

In a technically advantageous embodiment of the method, an intensity of the radiation source and a temperature of the heating means are time controlled. This also achieves, for example, the technical advantage that a finely tuned exposure and thermal treatment can be carried out in order to obtain a desired coloring of the dental object.

In a further technically advantageous embodiment of the method, the radiation source and heating means are activated simultaneously or with a time delay. This also achieves, for example, the technical advantage that the exposure can be carried out before or during the thermal treatment.

In a further technically advantageous embodiment of the method, a color value of the dental object is detected by an electronic camera. This also achieves, for example, the technical advantage that the color value of the dental object can be monitored during heating.

In a further technically advantageous embodiment of the method, heating of the dental object is terminated when the dental object has reached a predetermined color value. This also provides, for example, the technical advantage that the predetermined color value can be precisely achieved.

BRIEF DESCRIPTION OF THE DRAWINGS

Examples of embodiments of the invention are shown in the drawings and will be described in more detail below.

DETAILED DESCRIPTION

Figure 1:
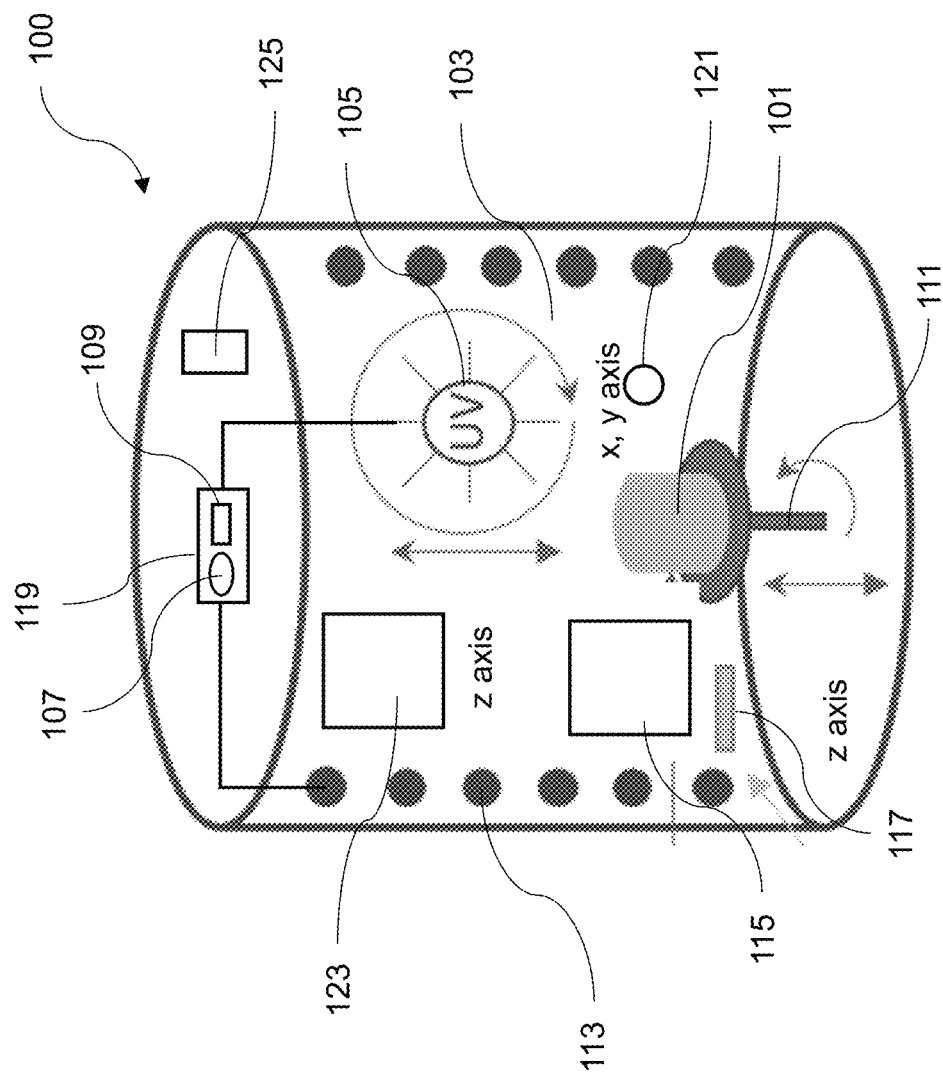
FIG. 1 shows a schematic representation of an oven for heating a dental object.

FIG. 1 shows a schematic diagram of an oven 100 for heating a dental object 101 in a chamber 103. The oven 100 comprises a heating means 113 for heating the dental object 101 in the chamber 103, such as a heating coil. The oven 100 can be operated under vacuum (adjustable oxygen partial pressure) or different atmospheres (air, inert gas) or mixtures.

The dental object 101 is made of a polychromic glass and or a polychromic glass ceramic, which can be colored by an exposure together with a thermal treatment. The distinct color effect of the dental object 101 is produced mainly by a thermal treatment after light exposure. The dental object 101 is a dental restoration, such as a crown, a bridge, a veneer, an abutment, an inlay or an onlay.

The heating means 113 may be formed by, for example, an infrared radiation source, a laser radiation source, a microwave radiation source, or an induction radiation source. The laser radiation source may be formed by a thermal laser or infrared laser, such as a Nd:YAG laser, an Er:YAG laser, a CO laser or a CO2 laser. The heating means 113 may also be formed by, for example, an electrically powered infrared lamp, a red-light lamp or a heat lamp.

If sufficient energy is absorbed by the glass-ceramic, any other wavelength may be used, such as in the visible or UV range, since all that matters for heating is the thermal input into the dental object 101. Alternatively, the heat treatment may be performed using microwave radiation.

The heating means 113 is capable of heating the dental object 101 to a temperature up to 1200° C., in particular in a temperature range between 25° C. and 1200° C., between 25° C. and 1100° C. or between 25° C. and 1000° C.

The heating means 113 may be arranged inside or outside the chamber 103. Radiation guidance into the chamber 103 may be by means of an optical fiber. The heating means 113, such as an IR laser, may also be arranged outside the chamber. The emitted radiation can then be scanned by means of a scanner (e.g. DMD—Digital Mirror Device) through a suitable viewing window, over the dental object 101 arranged inside the chamber 103. This provides, for example, the technical advantage of heating the dental object 101 and completing a coloring of the dental object.

In addition to the heating means 113, the oven 100 includes a radiation source 105. The radiation source 105 is for exposing the dental object 101 to light prior to or during thermal treatment in the oven 100. The radiation source 105 is for emitting radiation having a wavelength that is less than 350 nm into the chamber 103. The emitted radiation is for exposing the dental object to light. The emitted radiation from the radiation source 105 impinges on the dental object 101, and the radiation excites electronic transitions in the dental object 101 that result in a color change when the dental object 101 is subsequently or simultaneously heated.

The radiation source 105 is electrically powered and is formed by, for example, a mercury vapor lamp, a quartz lamp, a black light lamp, a UV laser, or a UV light emitting diode. However, the radiation source 105 may also comprise an X-ray tube for generating X-rays. In this case, the radiation source 105 may emit radiation having a wavelength of 5 pm to 10 nm.

The radiation source 105 is suitable for emitting radiation with a wavelength between 350 nm and 5 pm, preferably between 350 nm and 10 nm, or most preferably between 350 nm and 100 nm. However, in addition to using UV radiation, it is also possible to expose the dental object 101 to high energy radiation. For example, with X-rays having a wavelength of 5 pm to 10 nm. However, radiation in the range of 100 nm to 350 nm is particularly preferred to excite electron transitions in the polychromic material.

The oven 100 may include a UV transparent holder on which a dental object 101 having a cavity may be placed, allowing illumination of the dental object 101 on the inside. The chamber 103 may include a door 115 that is opened to allow the dental object 101 to be placed inside. To expose the dental object 101 to light, the door 115 is closed to prevent light from exiting the chamber 103 to the outside.

The radiation source 105 may comprise an electrical switch which is actuated when the door 115 is opened, and by which the radiation source 105 is deactivated. This provides the technical advantage of preventing hazardous radiation from escaping from the chamber 103. The radiation source 105 is arranged, for example, in a wall of the chamber 103 so that it can radiate into the interior. An aperture plate 121 may be arranged in front of the radiation source 105 to shield the lateral regions of the radiation, such as a pinhole. This allows the emitted radiation to be directed to specific areas of the dental object 101.

However, the oven 100 may also include an optical fiber used to deliver radiation from the radiation source 105 to the dental object 101, such as a silica fiber. The radiation source 105 may be disposed behind a special glass, such as a filter disk that allows only predetermined wavelength ranges to pass through.

In order to adjust the intensity of the radiation source 105 or the heating power of the heating means 113, the oven 100 comprises an adjustment means 107. The adjustment means 107 may be formed by respective controllers that may be used to control the power of the radiation source 105 or the heating means 113. This adjustment means 107 may, for example, be used to adjust the current or voltage at which the radiation source 105 or the heating means 113 is operated.

However, the adjustment means 107 may also be implemented digitally. In this case, the oven 100 comprises a data interface 117 through which data for controlling the intensity of the radiation source 105 or the power of the heating means 113 can be transmitted from an external device, such as a WLAN interface or a Bluetooth interface.

For example, a mobile phone or tablet can be equipped with a suitable application that can control the intensity of the radiation source 105 or the power of the heating means 113. To this end, the oven 100 includes a control device 119 that communicates with the application and that can increase or decrease the emitted intensity of the radiation source 105 or the power of the heating means 113. The control device 119 may comprise a microprocessor and a digital memory storing data and programs for controlling the functions of the oven 100.

In addition, the control device 119 may include a timer means 109 that activates the radiation source 105 or the heating means 113 for a predetermined period of time and automatically deactivates the radiation source 105 or the heating means 113 after the predetermined period of time has elapsed. The control device 119 may activate the radiation source 105 or the heating means 113 simultaneously or with a time delay. This provides the technical advantage that the dental object 101 can be automatically exposed for a predetermined exposure time, and a defined exposure of the dental object 101 with subsequent heat treatment is performed. The control device 119 may be configured to temporally control the intensity of the radiation source 105 and the temperature of the heating means 113, for example based on predetermined intensity and temperature curves.

The control device 119 may further comprise a learned algorithm for controlling the radiation source 105 and/or the heating means 113. US 20220318520, 20220318683, and U.S. Pat. No. 11,408,629 are directed to systems and methods using machine learning algorithms or natural language processing (NLP) and are hereby incorporated by reference in their entirety. The algorithm may be a machine learning algorithm or may comprise an artificial neural network. The algorithm is learned using training data.

This provides, for example, the technical advantage of using efficient technology to automatically generate a specific exposure-temperature program based on experimental data to achieve a desired hue. The experimental data serves as training data to determine the hue. When a desired hue is provided as input to the machine learning algorithm, the algorithm can determine a suitable exposure-temperature program for controlling the radiation source 105 and/or the heating means 113. In this manner, the exposure temperature program may be automatically generated using the machine learning algorithm. The exposure temperature program may be generated in the background using the machine learning technology and provided to the control device 119.

The control device 119 may also comprise an electronic lookup table in which the respective control data for the radiation source 105 and the heating means 113 are stored for predetermined shades of the dental object 101. In this way, the dental object 101 with the desired shade can be automatically generated.

The oven 100 may include a single or multiple radiation sources 105 for emitting radiation having a wavelength that is less than 350 nm. By using a single radiation source 105, the technical complexity of manufacturing the oven 100 is reduced. When using a single radiation source 105, it is advantageous to move the dental object 101 in different spatial directions so that the radiation can hit on all areas of the dental object 101.

To this end, the oven 100 comprises a moving means 111 for moving the dental object 101 in front of the radiation source 105 or the heating means 113. The moving means 111 is configured to move the dental object 101 in a height and/or to rotate it with respect to the radiation source 105 or the heating means 113. The axis of rotation is, for example, a vertical axis (z-axis). Along the axis of rotation, the dental object 101 can additionally be moved linearly.

The movement means 111 is formed, for example, by a turntable on which the dental object 101 can be arranged. The turntable is rotatable in front of the radiation source 105 or the heating means 113 and is adjustable in height. For this purpose, the turntable is driven, for example, by electric motors via a suitable mechanism.

However, the movement means 111 can also be formed by a mechanical arm that can be used to move the dental object 101 inside the chamber 103 in all spatial directions. With this arm, the dental object 101 can be controllably moved in front of the radiation source 105. Both the dental object 101 and the radiation source 105 or the heating means 113 may be positionable in x, y and z directions.

For example, the dental object 101 may be disposed on a movable table that is movable in the three spatial directions. The radiation source 105 may comprise an optical fiber that is movable in the three spatial directions. The movement of the radiation source 105 or the heating means 113 as well as the dental object 101 can be realized by a robotic arm.

The movement means 111 may also be controlled by the electronic control device 119. The electronic control device 119 may also store a movement program that controls the movement means 111, thereby moving the dental object 101 in a predetermined time sequence with respect to the radiation source 105 or the heating means 113. The movement program can be used to position the dental object 101 relative to the radiation source 105 or the heating means 113. In doing so, various positions can be approached one after the other.

On the other hand, it is also possible to move the radiation source 105 or the heating means at a height and/or around the dental object 101 via a further movement means. Also, for this purpose, electric motors can be driven via a suitable mechanism. In general, the dental object 101 and/or the radiation source are freely movable.

When multiple radiation sources 105 are used, they may be arranged around the dental object 101. In this way, the dental object 101 can be illuminated from several sides. In this case, a movement means 111 can be dispensed with.

The heating means 113 may also be movably arranged so that it can be changed in a height and moved around the dental object 101. An aperture plate 121 may also be arranged in front of the heating means 113 to shield the lateral regions of the radiation, such as a pinhole.

The temperature of the dental object 101 in the chamber 103 may be determined using a radiation pyrometer or a suitable thermocouple. The thermocouple may be routed to the dental object 101 for this purpose. The signals about the temperature of the dental object 101 are fed to the control device 119. In this way, the control device 119 can precisely adjust the temperature to a predetermined value.

The oven 100 may include an electronic camera 125 for capturing a color value of the dental object 101. The electronic camera 125 is capable of capturing an image of the dental object 101. Through the electronic camera 125, for example, an RGB color value or an L*a*B color value of the dental object 101 can be captured and transmitted to the control device 119. The control device 119 can deactivate the heating means 113 when the RGB color value corresponds to a predetermined RGB color value.

Once the thermal treatment of the dental object 101 is completed, the dental object 101 may be cooled down to room temperature. This is done by means of a cooling means 123 for cooling the heated dental object 101. For example, the dental object 101 is cooled by means of an air flow generated by a fan as the cooling means 123. The cooling means 123 can also be activated and deactivated by the control device 119.

Figure 2:
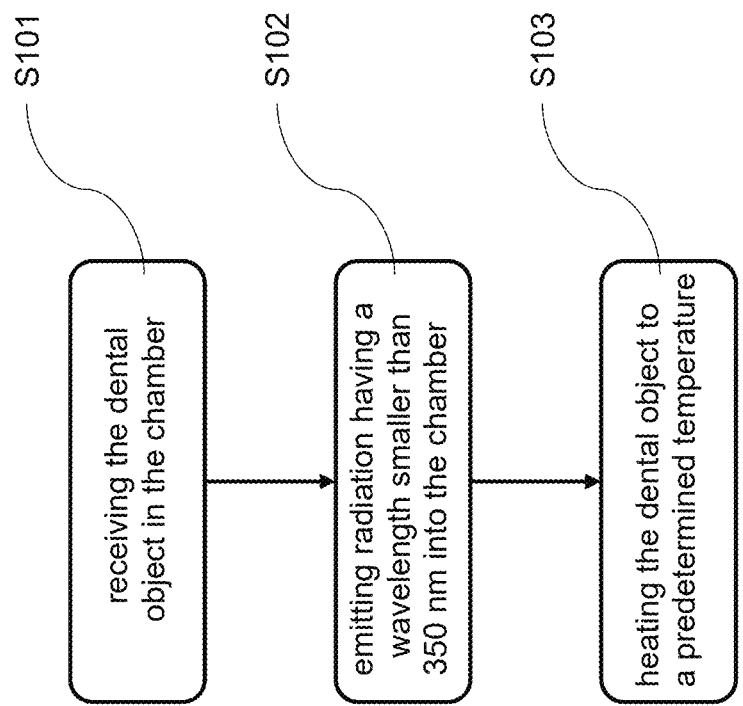
FIG. 2 shows a block diagram of a method for heating the dental object.

FIG. 2 shows a block diagram of a method of heating the dental object 101. The method comprises the step S101 of receiving the dental object 101 in the chamber 103. In the step S102, radiation having a wavelength smaller than 350 nm is emitted into the chamber 103 by the radiation source 105 so as to be incident on the dental object 101. In step S103, the dental object 101 in the chamber 103 is heated to a predetermined temperature by the heating means 113. Areas of the dental object 101 exposed to the radiation take on a color depending on the previous exposure after the dental object 101 is heated. This method achieves the technical advantage that the dental object 101 can be safely exposed and heated for coloring in the same means.

All of the features explained and shown in connection with individual embodiments of the invention may be provided in various combinations in the subject matter of the invention to simultaneously realize their beneficial effects.

All method steps can be implemented by means suitable for executing the respective process method. All functions that are carried out by objective features can be a method step of a method.

The scope of protection of the present invention is given by the claims and is not limited by the features explained in the description or shown in the figures.

REFERENCE LIST

100 Oven
101 Dental object
103 Chamber
105 Radiation source
107 Adjustment means
109 Timer
111 Movement means
113 Heating means or source
115 Door
117 Data interface
119 Control device or controller
121 Aperture plate
123 Cooling means
125 Electronic camera

The invention claimed is:

1. An oven (100) for heating a dental object (101), comprising:
   a chamber (103) for receiving the dental object (101);
   a radiation source (105) for emitting radiation having a wavelength smaller than 350 nm into the chamber (103);
   a heating source (113) separate from the radiation source (105) for heating the dental object (101) in the chamber (103);
   a controller (119) for controlling the radiation source (105) and the heating source (113); and
   an electronic camera (125) for detecting a color value of the dental object (101);
   wherein the controller (119) is configured to activate the radiation source (105) and the heating source (113) simultaneously or with a time delay between first activating the radiation source (105) followed by activating the heating source (113).

2. The oven (100) according to claim 1,
   wherein the heating source (113) is configured to heat the dental object (101) to a temperature up to 1200° C.

3. The oven (100) according to claim 1,
   wherein the controller (119) comprises a learned algorithm for controlling the radiation source (105) and/or the heating source (113).

4. The oven (100) according to claim 1,
   wherein the oven (100) is configured to terminate a heating of the dental object (101) when the dental object (101) has reached a predetermined color value.

5. The oven (100) according to claim 1,
   wherein the oven (100) comprises a cooling means (123) for cooling the heated dental object (101).

6. The oven (100) according to claim 1,
   wherein the heating source (113) comprises an infrared radiation source, a laser radiation source, a microwave radiation source or an induction radiation source.

7. The oven (100) according to claim 1,
   wherein the oven (100) comprises a moving means (111) comprising a turntable, movable table or a mechanical arm for moving the dental object (101) in front of the heating source (105) and/or the radiation source.

8. A method of heating a dental object (101), comprising the steps in the following order:
   receiving (S101) the dental object (101) in a chamber (103);
   emitting (S102) radiation having a wavelength smaller than 350 nm into the chamber (103) through a radiation source (105);
   heating (S103) the dental object (101) in the chamber (103) by a heating source (113); and
   detecting a color value of the dental object (101) using an electronic camera (125).

9. The method according to claim 8,
   wherein an intensity of the radiation source (105) and a temperature of the heating source (113) are time controlled.

10. The method according to claim 8,
    wherein the radiation source (105) and heating source (113) are activated simultaneously or with a time delay.

11. The method according to claim 8,
    wherein heating of the dental object (101) is terminated when the dental object (101) has reached a predetermined color value.

* * * * *